(12) United States Patent
Cutler (10) Patent No.: US 6,418,312 B1
(45) Date of Patent: Jul. 9, 2002

(54) MANAGEMENT OF PERFERRED COMMUNICATIONS PERIODS IN A SATELLITE COMMUNICATION SYSTEM

(75) Inventor: Victor H. Cutler, Overgaard, AZ (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/385,511

(22) Filed: Aug. 30, 1999

(51) Int. Cl.⁷ ................................. H04Q 7/20
(52) U.S. Cl. .................. 455/427; 455/406; 455/450; 455/12.1; 455/13.4
(58) Field of Search ................... 455/427, 450, 455/12.1, 405, 406, 509, 408, 13.4; 342/352, 357.1

(56) References Cited

U.S. PATENT DOCUMENTS

| | | | |
|---|---|---|---|
| 4,670,899 A | 6/1987 | Brody et al. ................... 379/60 |
| 5,448,621 A | 9/1995 | Knudsen ........................ 379/58 |
| 5,574,969 A | 11/1996 | Olds et al. .................. 455/12.1 |
| 5,794,140 A * | 8/1998 | Sawyer ......................... 455/408 |
| 5,812,538 A | 9/1998 | Wiedeman et al. ........... 370/316 |
| 5,862,478 A * | 1/1999 | Cutler, Jr. et al. ........... 455/427 |
| 5,887,259 A | 3/1999 | Zicker et al. ................. 455/434 |
| 5,924,015 A * | 7/1999 | Garrison et al. ............. 455/13.4 |
| 6,070,052 A * | 5/2000 | Ogasawara et al. ......... 455/13.1 |
| 6,226,521 B1 * | 5/2001 | Liu et al. ...................... 455/450 |

\* cited by examiner

*Primary Examiner*—William Trost
*Assistant Examiner*—Simon Nguyen
(74) *Attorney, Agent, or Firm*—Ingrassia Fisher & Lorenz; Frank J. Bogacz (57) ABSTRACT

A method (46) controls preferred communications periods as satellites (12) of a satellite-based communication system (10) move in their orbits (14) around the earth. The satellites (12) monitor for periods of low subscriber activity, and evaluate conditions such as a quantity of idle channels (60), available power level for the satellites (68), and satellite functional status (76) to control the onset and termination of preferred communications periods. A preferred communications period is initiated by transmitting an alert message to the subscriber units (26) in a coverage zone (16) and notifying a billing center (32). During a preferred communication period, the subscribers can be provided with incentives, such as discounted airtime rates, to increase call activity on the system (10).

21 Claims, 5 Drawing Sheets

| SATELLITE CONDITIONS | | | | | |
|---|---|---|---|---|---|
| COMMUNICATION CHANNELS | | POWER LEVEL | | SATELLITE HEALTH | |
| SATELLITE 12" | SATELLITE 12"" | SATELLITE 12" | SATELLITE 12"" | SATELLITE 12" | SATELLITE 12"" |
| | 140 | | | | |
| | | 78 | 138 | 80 | |

MANAGEMENT OF PERFERRED COMMUNICATIONS PERIODS IN A SATELLITE COMMUNICATION SYSTEM

TECHNICAL FIELD OF THE INVENTION

The present invention relates to satellite-based communications. More specifically, the present invention relates to techniques for increasing the utilization of available communication channels assigned to a satellite.

BACKGROUND OF THE INVENTION

For many years, landline telecommunications carriers have adopted an on-peak/off-peak billing strategy for telecommunications. "On-peak" is typically the period of time in the business day during which there is a high volume of telecommunications taking place. Accordingly, the landline carriers charge full price for long distance communications during this on-peak period. In contrast, "off-peak" is typically the period of time after the business day has ended during which business communications drop sharply and residential calling builds. The landline carriers typically offer discounted rates on long distance telecommunications during this off-peak period to encourage utilization of the landline telecommunications system during these low usage periods and to discourage utilization of the landline telecommunications system for residential calls during the higher usage periods.

Likewise, many cellular communications system carriers also have adopted an on-peak/off-peak billing strategy for telecommunications. Typically, off-peak rates may be available for cellular calls between 7:00 p.m. and 7:00 a.m. in a given geographical area, and on weekends and holidays. The goal is to encourage more cellular calls during typical periods of low activity, so as to more efficiently utilize the frequency spectrum, or communication channels, assigned to a particular cellsite. In other words, the off-peak period can be construed as a "preferred communications period" from the perspective of the subscriber since the airtime rates are lower. Furthermore, since there is lower utilization of the frequency spectrum, the subscriber's call is more likely to be successfully allocated a communication channel.

In conventional land-based cellular communications systems, the on-peak/off-peak periods generally follow a predictable pattern since land-based cellular systems have cell sites at fixed, spaced apart locations. Thus, once the call activity pattern is determined in a fixed location, or a cell, served by the cell site, the preferred communications period and the corresponding discounted rate can be established for that particular geographical location.

This established preferred communications period (i.e., off-peak period) for the particular geographical location can be readily remembered by subscribers. However, since the established preferred communication period is based on a prediction of call activity, the actual call activity may differ. In other words, there may be pockets of low call activity during on-peak periods, and there may be pockets of high call activity during off-peak periods.

Conventional on-peak/off-peak periods cannot adapt to these unexpected pockets of low or high activity.

In a satellite-based communication system that provides world-wide or near world-wide radio communications service through a plurality of orbiting base stations, i.e., satellites, the conventional on-peak/off-peak periods for a particular satellite coverage zone are not as predictable as the conventional land-based system. The larger size of a satellite's footprint, or coverage zone, as opposed to the size of a cell in a land-based cellular system gives rise to a greater number of variables when attempting to predict on-peak/off-peak call activity periods. Such variables include satellite orbital dynamics, holidays specific to particular cultures, differing business hours in different countries receiving radio communications services in the same satellite coverage zone, variances in the quantities of subscriber units in different countries within the same satellite coverage zone, and so forth. These variables significantly complicate the predictions. In addition, on-peak/off-peak periods established in response to the complicated predictions can be difficult for the subscribers to remember.

One strategy for providing incentives to potentially increase cellular calling during low activity periods in a satellite-based communication system could entail the acquisition of predictable on-peak/off-peak activity data of the satellite-based cellular network in much smaller geographical locations within a give satellite coverage area. This data could be stored, for example, in a billing center in order to apply on-peak or off-peak airtime rates to particular calls. Unfortunately of data required to effectively initiate such a multiple rate billing strategy could lead to a vastly complicated and expensive billing program and to subscribers unaware of changes made in response to dynamic conditions. Moreover, such a strategy is not able to adapt to unexpected periods of low cellular activity as they arise.

Satellite-based communication systems that provide world-wide or near world-wide radio communications service are becoming more pervasive because they offer great mobility. That is, the subscriber may place and receive calls from anywhere in the world and may generally move without restriction from one satellite radio communications coverage zone to another while using the satellite-based communication system. Unfortunately, when a strategy such as that described above has been adopted, a subscriber who travels extensively does not necessarily know when on-peak and off-peak rates take effect in the differing geographical locations in which the subscriber may travel. Accordingly, traveling subscribers would not necessarily be motivated to utilize the satellite-based communication systems during low activity periods.

Thus, what is needed is a system and method for potentially increasing call activity in a satellite-based communication system that detects low call activity periods as they arise and informs subscriber units of these low activity periods.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
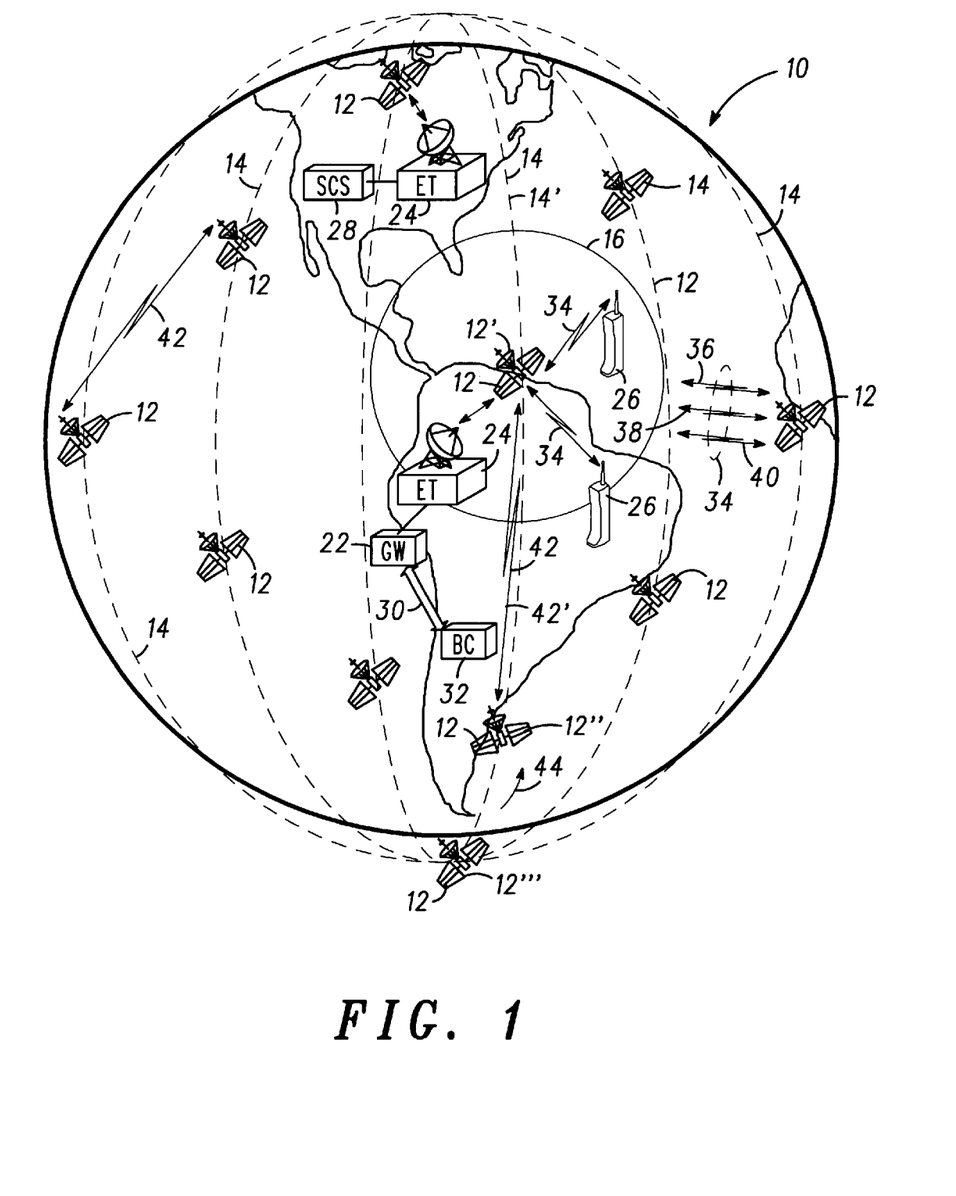
FIG. 1 shows a simplified diagram of a satellite-based communication system.

FIG. 1 illustrates a simplified diagram of a satellite-based communication system 10 within which the present invention may be practiced. Communication system 10 uses six polar orbits 14, with each orbit 14 holding eleven satellite communication stations 12 for a total of sixty-six satellites 12. However, this is not essential and more or fewer satellites, or more or fewer orbits, or orbital inclinations, may be used. While the present invention is advantageously employed when a large number of satellites are being used, it is also applicable for a small number of satellites. For clarity, FIG. 1 illustrates only a few satellite communication stations 12.

The total compliment of sixty-six satellites 12 in communication system 10 form a "constellation" of satellites arranged in orbits for providing specified coverage (e.g., radio communication) of portion(s) or all of the earth. A constellation typically includes multiple rings (or planes) of satellites and may have equal numbers of satellites in each plane, although this is not essential. The present invention is applicable to systems that include satellites having low-Earth or medium-Earth orbits. In addition, the orbits may have any angle of inclination (e.g., polar, equatorial, or other orbital pattern).

For the example shown, each orbit 14 encircles the Earth at an altitude of around 780 km, although higher or lower orbital altitudes may be usefully employed. With the example of sixty-six satellites 12 in six orbits 14, at least one of satellites 12 is within view of each point on the earth's surface at all times. In other words, full coverage of the earth's surface is obtained. The area in which a satellite 12 provides radio communication services is a coverage zone 16.

Satellites 12 travel with respect to earth at around 25,000 km/hr, allowing satellite 12 to be visible to a terrestrial station for a maximum period of approximately nine minutes. Satellites 12 communicate with terrestrial stations which may include some number of radio communication subscriber units (SUs) 26 and earth terminals (ETs) 24 connected to a system control segment (SCS) 28. ETs 24 may also be connected to gateways (GWs) 22, which provide access to the public switched telephone network (PSTN), generally represented by a bidirectional arrow 30, or other communications facilities.

Only one each of GWs 22 and SCS 28, and two of SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress). These data packets may include call duration, time-of-day of call, and so forth that is relayed from satellites 12 through GWs 22 over PSTN 30 to a billing center (BC) 32 for tracking calls and subsequently billing the subscribers.

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones adapted to communicate with satellites 12. Communication system 10 may accommodate any number, potentially in the millions, of subscriber units 26. Subscriber units 26 communicate with nearby satellites 12 via subscriber links 34. Links 34 encompass a limited portion of the electromagnetic spectrum that is divided into numerous channels. Links 34 are preferably combinations of L-Band frequency channels, and may be operated in accordance with Frequency Division Multiple Access (FDMA), Code Division Multiple Access (CDMA), and/or Time Division Multiple Access (TDMA) communications.

Links 34 include one or more broadcast channels 36, acquisition channels 38, and communication channels 40. A satellite 12 continuously transmits over one or more broadcast channels 36. Subscriber units 26 synchronize to broadcast channels 36 and monitor broadcast channels 36 to detect data messages which may be addressed to them. These data messages include both ring-alerts which notify a subscriber unit that another party desires communications, as well as pages which deliver specific messages. In addition, subscriber units 26 may transmit messages to satellites 12 over one or more acquisition channels 38. Broadcast channels 36 and acquisition channels 38 are not dedicated to any one subscriber unit 26 but are shared by all subscriber units 26 currently within view of a satellite 12.

Communication channels 40 are assigned to particular subscriber units 26 by satellites 12 from time to time. At least one communication channel 40 is assigned for each call, and each communication channel 40 has sufficient bandwidth to support, as a minimum, a two-way voice conversation. A communication channel as used throughout this description means the frequency, time, and/or code resources that are combined to support real-time two-way communication. To support real-time communications, a TDMA scheme is used by system 10 to divide time into frames. Particular communication channels 40 are assigned particular transmit and receive time-slots within each frame, each operating on a selected radio frequency. Each satellite 12 supports up to a thousand or more communication channels 40 so that each satellite can simultaneously service a like number of independent calls.

Satellites 12 communicate with each other via cross links 42. Cross links 42 form a backbone of space-based communication system 10. Using cross links 42, communication system 10 may establish a communication path for relaying data between pairs of satellites 12, through the satellites 12 between any two subscriber units 26, between SCS 28 and gateway 22, between any two gateways 22, or between a subscriber unit 26 and gateway 22. In an exemplary scenario, a satellite 12' communicates user information (e.g., voice, fax, and/or data) and satellite control information with a satellite 12" over a cross link 42'. In the preferred embodiment, satellite control information includes a preferred communications period for coverage zone 16, and is described below.

In the exemplary scenario, satellite 12' is currently providing radio communication services to subscriber units 26 located in coverage zone 16. As described previously, satellite 12' provides radio communication services in coverage zone 16 for approximately nine minutes. Satellite 12" follows satellite 12' in an orbit 14', as generally indicated by an arrow 44. As satellite 12' gradually moves out of coverage zone 16 and satellite 12" gradually moves into coverage zone 16, calls over communication channels 40 assigned to satellite 12' are switched to communication channels 40 assigned to satellite 12" in a hand-off procedure known to those skilled in the art.

Figure 2:
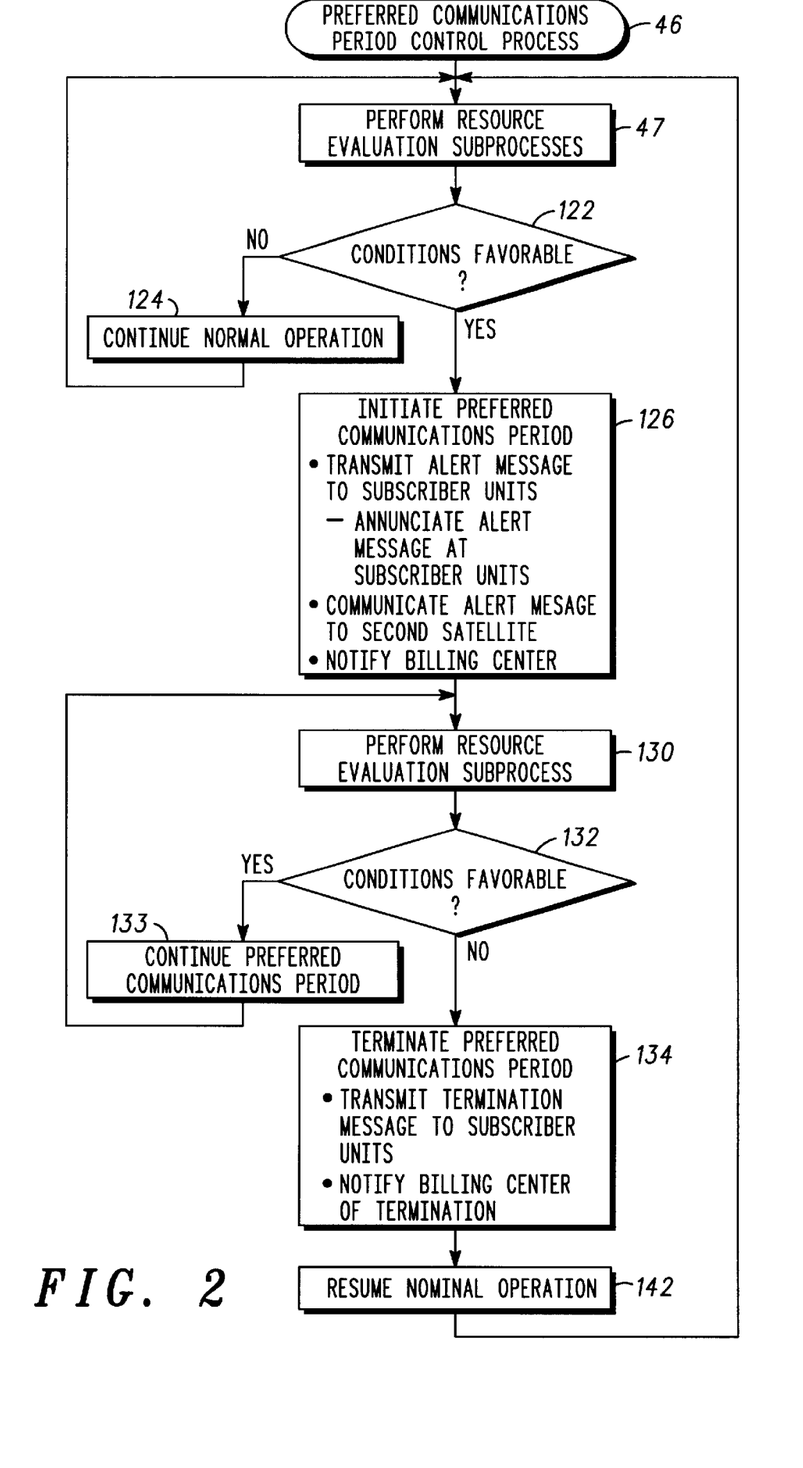
FIG. 2 shows a flowchart of a preferred communication period control process in a preferred embodiment of the present invention.

FIG. 2 illustrates a flowchart of a preferred communication period control process 46 in accordance with a preferred embodiment of the present invention. Process 46 controls the initiation and termination of a preferred communication period for coverage zone 16. The preferred communication period is initiated for coverage zone 16 when the utilization of, or activity on, communication channels 40 (FIG. 1) assigned to satellite 12' is low and may continue after radio communications services have been handed off from satellite 12' to satellite 12". The preferred communication period is a duration of time during which incentives may be provided to subscribers to increase call activity during low activity periods and more effectively utilize the communication channels 40 assigned to satellites 12.

Process 46 is preferably executed by processors (not shown) in each of satellites 12. However, for clarity of illustration, process 46 is described in connection with satellites 12' and 12" each of which orbit the earth on a common orbital path, orbit 14'. Thus, satellite 12' provides radio communication services to coverage area 16 (FIG. 1) during a first communication duration (e.g., nine minutes) and satellite 12" which provides radio communication services to coverage area 16 during a second communication duration (e.g., the next nine minutes). However, it should be readily understood that process 46 is occurring in each of satellites 12 to provide dynamic control of preferred communications periods for individual satellite coverage areas.

Figure 3A:
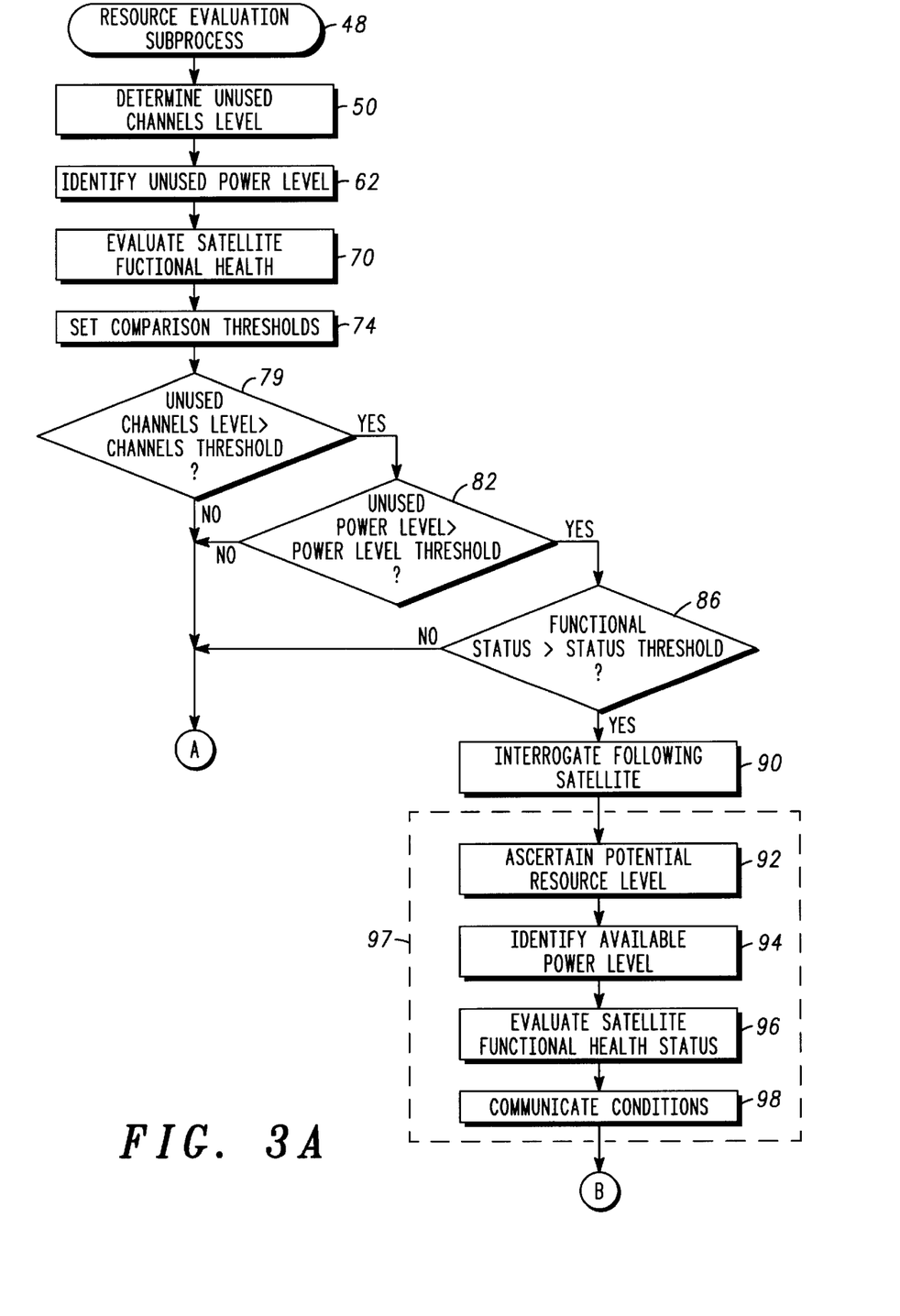
FIGS. 3A and 3B show a flowchart of a resource evaluation subprocess in a preferred embodiment of the present invention.

Process 46 begins with a task 47. Task 47 causes satellite 12' to perform a resource evaluation subprocess. FIG. 3 illustrates a flowchart of a resource evaluation subprocess 48 in a preferred embodiment of the present invention. Subprocess 48 is performed by satellite 12' to determine if the conditions are favorable for the initiation of a preferred communications period. In addition, subprocess 48 is performed to determine if the conditions are favorable for continuing a preferred communications period once it has been initiated. Subprocess 48 begins with a task 50.

Task 50 determines the unused channels level of satellite 12'. The unused channels level is the quantity of idle communication channels 40 out of a total quantity of communication channels 40 assigned for radio communication between satellite 12' and terrestrial stations, such as subscriber units 26 and earth terminals 24. In other words, the idle communication channels 40 are those channels that are not currently being used, so they can be assigned to future calls. Satellite 12' records the unused channels level in a satellite conditions table or similar data structure.

Figure 4:
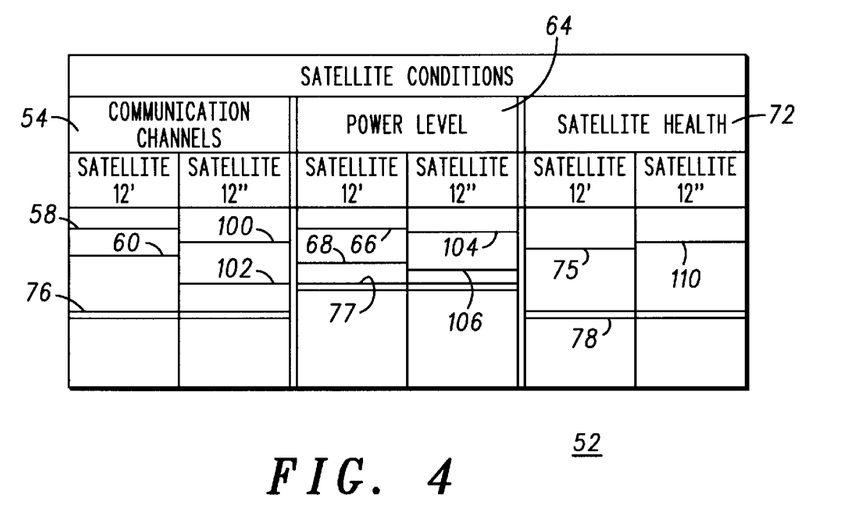
FIG. 4 shows an exemplary satellite conditions table compiled in response to a first iteration of the resource evaluation subprocess.

Referring to FIG. 4 in connection with FIG. 3, FIG. 4 shows an exemplary satellite conditions table 52 compiled in response to a first iteration of resource evaluation subprocess 48. For clarity of illustration, table 52 is illustrated as a bar graph for comparing satellite conditions (described below) with predetermined thresholds (described below).

Satellite conditions table 52 has a communications channels memory field 54. Memory field 54 includes an entry 58 for satellite 12' that corresponds to a total quantity of communication channels 40 (FIG. 1) allocated for radio communication with satellite 12'. An entry 60 corresponds to the unused channels level determined in task 50.

Following determination of unused channels level 60 in task 50, subprocess 48 proceeds to a task 62. Task 62 identifies an unused power level for satellite 12' (FIG. 1). The unused power level for satellite 12' is the amount of charge remaining in the batteries (not shown) resident in satellite 12'. The unused power level depends in part upon the previous and current radio communications activity, and the battery recharging schedule for satellite 12'.

Satellite conditions table 52 has a power level memory field 64 which includes an entry 66 for satellite 12' that corresponds to a total power capacity for satellite 12'. In other words, total power capacity 66 represents the amount of power available to satellite 12' when the batteries in satellite 12' are fully charged. An entry 68 corresponds to the unused power level identified in task 62.

In addition to tasks 50 and 62, subprocess 48 performs a task 70. Task 70 evaluates the functional status, i.e., current health, of satellite 12'. Satellite 12' may perform task 70 by executing a systems check-out procedure to determine to what degree satellite 12' may be malfunctioning. The systems check-out procedure may be particularly focused on factors that relate to the ability of satellite 12' to sustain communications. These factors may include hardware failure status, software work-around status and capability.

Satellite conditions table 52 includes a satellite health memory field 72 with an entry 75 for satellite 12' that represents the functional status of satellite 12'. Functional status 75 may simply be an affirmative or negative indication of satellite health. Alternatively, the systems check-out procedure may be in the form of a plurality of tests, the results of which establish a measurable value or values for functional status 75 of satellite 12'.

Following task 70, a task 74 is performed to set comparison thresholds for unused channels level 60, unused power level 68, and functional status 75. The comparison thresholds are used to determine if conditions are favorable for initiating or continuing a preferred communications period which may increase the communications usage. Table 52 includes an unused channels threshold entry 76, a unused power level threshold entry 77, and a functional status threshold entry 78.

Unused channels threshold 76 is a desired minimum quantity, or percentage, of total channels 58 that should be idle prior to the initiation of a preferred communications period or in order to continue a preferred communications period. Unused channels threshold 76 is set so that a sufficient quantity of communications channels is available to satellite 12' for radio communications services in order to accommodate a subsequent increase in call activity in response to the initiation of or continuance of a preferred communications period. Unused channels threshold 76 may, for example, be approximately fifty percent of total channels 58.

It should be readily apparent to those skilled in the art that total channels 58 and threshold 76 are not constant values. Rather, total channels 58 may change in response to any implemented dynamic channel reallocation scheme that may be employed. Accordingly, threshold 76 will change relative to total channels 58.

Unused power level threshold 77 is a desired minimum amount of charge remaining on the batteries (not shown) in satellite 12' prior to the initiation of a preferred communications period or in order to continue a preferred communications period. Unused power level threshold 76 is set so that a sufficient amount of battery power is available to satellite 12' to accommodate a subsequent increase in call activity in response to the initiation of or continuance of a preferred communications period.

Functional status threshold 78 is a desired minimum functional ability of satellite 12' that is to be met prior to the initiation of a preferred communications period or in order to continue a preferred communications period. In particular, functional status threshold 78 relates to the ability of satellite 12' to conduct call communications.

Although task 74 is illustrated in subprocess 48 as being performed after tasks 50, 62, and 70, task 74 may be performed prior to or in conjunction with tasks 50, 62, and 70. In addition, unused channels threshold entry 76, unused power level threshold entry 77, and functional status threshold entry 78 may not be set at the same levels for both the initiation of and the continuation of the preferred communications channel. Rather, thresholds 76, 77, and 78 may be set higher when determining whether or not to initiate a preferred communications period and lower when determining whether or not to continue a preferred communications period.

Following task 74, satellite 12' performs a query task 79. Query task 79 determines if unused channels level 60 is greater than unused channels threshold 76 set in task 74. When unused channels level 60 is less than threshold 76, program control proceeds to a task 80. Task 80 provides an indication that conditions are not favorable for initiating a preferred communications period. However, when query task 79 determines that unused channels level 60 is greater than unused channels threshold 76, subprocess 48 proceeds to a query task 82.

Query task 82 determines if unused power level 68 is greater than unused power level threshold 77. When unused power level 68 is less than threshold 77, program control proceeds to task 80 indicating that conditions are not favorable for initiating a preferred communications period. However, when query task 82 determines that unused power level 68 is greater than power level threshold 77, subprocess 48 proceeds to a query task 86.

Query task 86 determines if satellite 12' is functioning well enough to support a subsequent increase in call activity in response to the initiation of a preferred communications period. In other words, satellite functional status 75 is compared to functional status threshold 78.

Like query tasks 79 and 82, when query task 86 determines that satellite functional status 75 is below functional status threshold 78, program control proceeds to task 80 indicating that conditions are not favorable for initiating a preferred communications period. However, when query task 86 determines that the function of satellite 12' is satisfactory, that is, satellite functional status 75 exceeds threshold 78, subprocess 48 proceeds to a task 90.

Task 90 causes satellite 12' (FIG. 1) to interrogate satellite 12" via crosslink 42' (FIG. 1) to obtain satellite conditions for satellite 12". As discussed previously, satellite 12' provides radio communications services in coverage zone 16 for approximately nine minutes. However, it is desirable that the duration of a preferred communications period be longer than nine minutes. Thus, satellite 12' interrogates satellite 12" to determine whether or not satellite 12" can continue to support the potential increase in call activity that may ensue following the initiation of a preferred communications period.

Figure 3B:
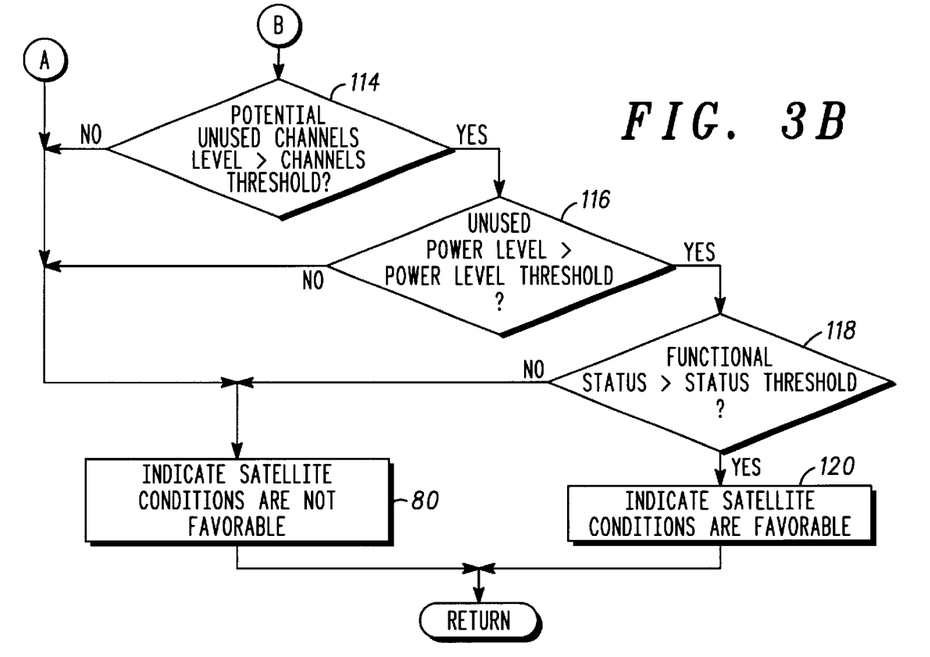

In response to an interrogation notice from satellite 12' in task 90, satellite 12" performs tasks 92, 94, 96, and 98. Tasks 92, 94, 96, and 98 are encircled by a dashed line 97 to indicate that these tasks are executed at satellite 12". Alternatively, satellite 12" may simply perform tasks 92, 94, 96, and 98 from time to time and send the results to other satellites 12 in system 10 (FIG. 1) without first receiving a specific interrogation message.

Task 92 causes satellite 12" to ascertain a potential unused channels level. The potential unused channels level is a quantity of potentially idle communication channels out of a total quantity of communication channels 40 allocated to satellite 12" for radio communication services. Communications channels memory field 54 of table 52 includes an entry 100 for satellite 12" that corresponds to a total quantity of communication channels 40 (FIG. 1) allocated for radio communication with satellite 12". An entry 102 corresponds to the unused channels level ascertained in task 92.

Total channels 100 allocated to satellite 12" need not equal total channels 58 allocated to satellite 12' because of channel reallocation schemes, satellite functional capability, and so forth. Nor is potential unused channels level 102 for satellite 12" necessarily equal to unused channels level 60 for satellite 12'. Potential unused channels level 102 indicates the quantity of communications channels 40 that may be idle or may be rendered idle in a hand-off procedure between satellite 12' and satellite 12" as satellite 12" begins radio communications service in coverage zone 16.

Following task 92, satellite 12" performs task 94. Task 94 identifies an unused power level for satellite 12" (FIG. 1). As discussed previously, the unused power level for satellite 12" depends in part upon the previous and current radio communications activity, and the battery recharging schedule for satellite 12". Power level memory field 64 of satellite conditions table 52 includes an entry 104 for satellite 12" that corresponds to a total power capacity for satellite 12". In other words, total power capacity 104 represents the amount of power available to satellite 12" when the batteries in satellite 12" are fully charged. An entry 106 corresponds to the unused power level identified in task 94.

Following task 94, task 96 evaluates the functional status, i.e., current health, of satellite 12". Like satellite 12', satellite 12" may perform task 96 by executing a systems check-out procedure as discussed previously in connection with task 70 to assess the ability of satellite 12" to conduct call communications. Satellite health memory field 72 of satellite conditions table 52 includes an entry 110 for satellite 12" that represents the functional status of satellite 12". Functional status 110 may simply be an affirmative or negative indication of satellite health. Alternatively, the systems check-out procedure may be in the form of a plurality of tests, the results of which establish functional status 110 of satellite 12". Accordingly, like functional status 75, functional status 110 indicates whether or not satellite 12" is functioning well enough to support a subsequent increase in call activity.

Following tasks 92, 94, and 96, task 98 is performed. Task 98 causes satellite 12" to communicate potential unused channels level 102, unused power level 106, and functional status 110 to satellite 12' over cross link 42'. In response to task 98, satellite 12' performs query tasks 114, 116, and 118.

Query task 114 is performed to determine if potential unused channels level 102 exceeds unused channels threshold 76. When query task 114 determines that potential unused channels level 102 does not exceed threshold 76, program control proceeds to task 80 indicating that conditions are not favorable for initiating a preferred communications period. Although both unused channels level 60 and unused channels level 102 are compared to threshold 76, it should be readily apparent that a threshold setting for the first satellite, i.e., satellite 12', is likely to differ from a threshold setting for the following satellite, i.e., satellite 12".

When query task 114 determines that potential unused channels level 102 exceeds threshold 76, subprocess 48 proceeds to query task 116. Query task 116 is performed to determine if unused power level 106 for satellite 12" exceeds unused power level threshold 77. When query task 116 determines that unused power level 106 does not exceed threshold 77, program control proceeds to task 80 indicating that conditions are not favorable for initiating a preferred communications period. Although both unused power level 68 for satellite 12' and unused power level 106 for satellite 12" are compared to threshold 77, it should be readily apparent that a threshold setting for satellite 12' is likely to differ from a threshold setting for satellite 12".

When query task 116 determines that unused power level 106 exceeds power level threshold 77, subprocess 48 proceeds to query task 118. Query task 118 determines if satellite 12" is functioning at a level sufficient to support a subsequent increase in call activity. In other words, satellite functional status 110 is compared to functional status threshold 78. For clarity of illustration, the satisfactory function of satellite 12" is indicated when functional status 110 is greater than functional status threshold 78 in table 52.

Like query tasks 114 and 116, when query task 118 determines functional status 110 is less than functional status threshold 78, program control proceeds to task 80 indicating that conditions are not favorable for initiating a preferred communications period. Although both functional status 75 for satellite 12' and functional status 110 for satellite 12" are compared to threshold 78, it should be readily apparent that a threshold setting for satellite 12' is likely to differ from a threshold setting for satellite 12".

When query task 118 determines that the function of satellite 12" is satisfactory, that is functional status 110 is greater than functional status threshold 78, subprocess 48 proceeds to a task 120. Task 120 provides an indication that conditions are favorable for the initiation of a preferred communications period. In order to have reached task 120 of subprocess 48, unused channels level 60, unused power level 68, and functional status 75 for satellite 12', as well as, potential unused channels level 102, unused power level 106, and functional status 110 for satellite 12" are sufficient for supporting the potential increase in call activity that may ensue in a subsequent preferred communications period.

In contrast, if any of unused channels level 60, potential unused channels level 102, unused power level 68, unused power level 106, functional status 75, and functional status 110 did not exceed their respective thresholds 76, 77, and 78, program control would have been directed to task 80 indicating that conditions were not favorable for the initiation of a preferred communication period. While subprocess 48 is described in which any one of unused channels level 60, potential unused channels level 102, unused power level 68, unused power level 106, functional status 75, and functional status 110 may cause satellite 12' to determine that conditions are not favorable, those skilled in the art will recognize that satellite 12' may determine that conditions are favorable if all of the remaining conditions are met.

Furthermore, those skilled in the art will recognize that an additional satellite 12 may be interrogated by satellite 12'. This additional satellite 12 orbits the earth in orbit 14' and provides radio communications services to coverage zone 16 following satellite 12".

Hence, satellite 12' may interrogate the additional satellite in order to determine if a preferred communications period can be in effect for a greater length of time.

Following either of tasks 80 or 120, subprocess 48 is complete, and program control returns to a query task 122 which follows task 47 in control process 46 (FIG. 2). Query task 122 causes satellite 12' to evaluate the indication provided by one of tasks 80 and 120 of subprocess 48 (FIG. 3) to determine if conditions are favorable for initiating a preferred communications period.

If subprocess 48 was complete following task 80, query task 122 determines that conditions are not favorable, and program control proceeds to a task 124. Task 124 causes system 10 (FIG. 1) to prevent the initiation of a preferred communication period by continuing current operation. The term "current operation" pertains to maintaining and managing call connections over system 10. In addition, specific to the present invention, current operation also includes the continuation of the current airtime charge.

In connection with task 124, process 46 loops back to subprocess 48 in order to periodically perform resource evaluation to determine if conditions have become favorable for the initiation of a preferred communications period. Subprocess 48 may be performed each time another one of satellites 12 begins radio communications services in coverage zone 16. Alternatively, resource evaluation subprocess 48 (FIG. 3) may be performed by the same satellite (for example, satellite 12') after a predetermined elapsed duration.

If subprocess 48 (FIG. 3) was complete following task 120, query task 122 determines that conditions are favorable, and program control proceeds to a task 126. Task 126 causes satellite 12' to initiate a preferred communications period. Initiation task 126 causes satellite 12' to transmit an alert message over broadcast channels 36 (FIG. 1) to subscriber units 26 (FIG. 1) located in coverage zone 16 (FIG. 1). In response to the alert message, subscriber units 26 may annunciate the alert message. Subscriber units 26 may annunciate the alert message by emitting an audible tone, displaying a graphical or textual message on a display panel (not shown) of a SU 26, and so forth. By annunciating the initiation of a preferred communications period, subscribers know when a period of lower airtime charges has begun, thus providing incentive to place calls.

Initiation task 126 also causes satellite 12' to communicate the alert message to satellite 12" over cross link 42'. In addition, task 126 causes satellite 12' to notify billing center 32 (FIG. 1) via gateway 22 (FIG. 1) of the initiation of the preferred communications period. Billing center 32 is notified so that call communications taking place in coverage zone 16 (FIG. 1) during the preferred communications period will be charged the appropriate discounted airtime rate.

Following initiation task 126, satellite 12' provides radio communications service to subscriber units 26 in coverage zone 16 at a discounted airtime rate. After task 126, control process 46 proceeds to a task 130. Task 130 causes satellite 12' to repeat resource evaluation subprocess 48 (FIG. 3). Alternatively, if satellite 12" is now providing radio communication services in coverage zone 16 (FIG. 1), task 130 causes satellite 12" to perform subprocess 48. This subsequent iteration of resource evaluation subprocess 48 is performed following the initiation of the preferred communications period to determine if conditions are favorable for continuing the preferred communications period.

When satellite 12' is providing radio communication services in coverage zone 16, resource evaluation subprocess 48 is repeated to evaluate satellite conditions for satellite 12' and satellite 12". However, when satellite 12" is providing radio communication services in coverage zone 16, resource evaluation subprocess 48 is performed for satellite 12" when satellite 12" provides radio communication services and a third satellite, satellite 12''' is about to provide service to coverage zone 16 (FIG. 1).

Referring momentarily to FIG. 1, satellite 12''' follows satellite 12" in orbit 14' in the direction of arrow 44. Thus, as satellite 12" moves out of coverage zone 16 and satellite 12''' moves into coverage zone 16, calls over communication channels 40 which were assigned to satellite 12" are gradually switched to communication channels 40 assigned to satellite 12'" during a hand-off procedure.

With reference back to process 46 in FIG. 2, following the subsequent iteration of resource evaluation subprocess 48 in task 130, process 46 proceeds to a query task 132. Query task 132 determines if conditions are favorable for continuing the preferred communications period. When conditions are favorable, program control proceeds to task 133, and the preferred communications period continues. In response to task 133, process 46 loops back to task 130 to repeat resource evaluation process 48 in accordance with a re-evaluation schedule (not shown).

When query task 132 determines that conditions are not favorable for the continuation of the preferred communications period, a task 134 is performed to terminate the preferred communications period.

Figure 5:
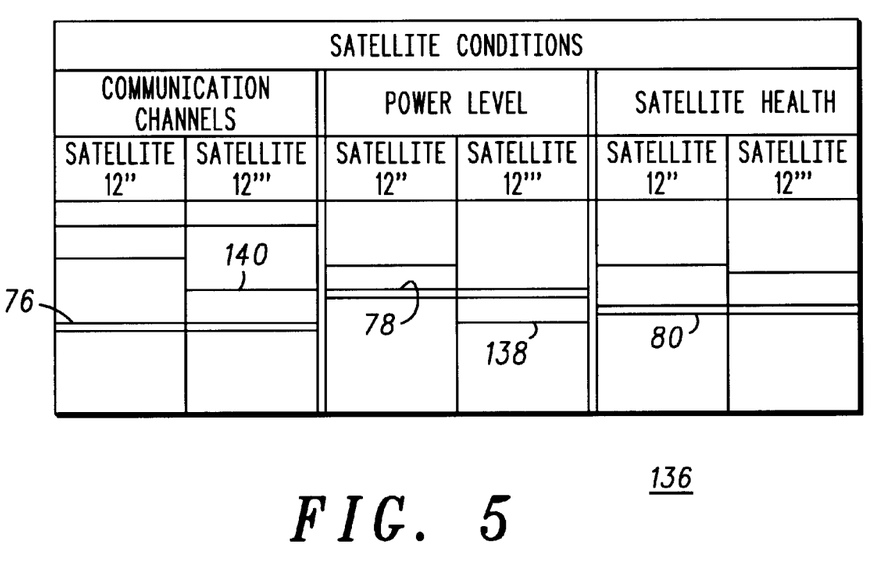
FIG. 5 shows an exemplary satellite conditions table compiled in response to a second iteration of the resource evaluation subprocess.

FIG. 5 shows a exemplary satellite conditions table 136 compiled in response to the second iteration of resource evaluation subprocess 48. In the exemplary embodiment, satellite 12" is providing radio communication services in coverage zone 16. Thus, satellite conditions table 136 is a compilation of the satellite conditions that were evaluated for each of satellites 12" and 12'" in task 130 to determine whether or not the preferred communications period should continue. Table 136 is not described in detail herein, since table 136 is similar to table 52 (FIG. 4). However, of interest in table 136, is an unused power level 138 for satellite 12'". Unused power level 138 indicates that the unused power, or remaining battery capacity of satellite 12'" for providing radio communications services is below power level threshold 78. Accordingly, even though a potential unused channels level 140 for satellite 12'" exceeds unused channels threshold 76, unused power level 138 for satellite 12'" indicates a situation in which conditions may not be favorable for the continuation of the preferred communications period.

Referring back to FIG. 2, task 134 causes satellite 12" to terminate the preferred communications period. Satellite 12" may terminate the preferred communications period immediately. Alternatively, satellite 12" may terminate the preferred communications period just prior to moving out of coverage zone 16 in order to optimize the duration of the preferred communications period.

In order to terminate the preferred communications period, satellite 12" transmits a termination message to subscriber units 26 located in coverage zone 16 (FIG. 1) over broadcast channels 36 (FIG. 1). In response to the termination message, subscriber units 26 may cease annunciation of the preferred communications period, or may annunciate the termination of the preferred communications period in order to inform the subscribers that airtime rates are returning to their nominal levels.

In addition, termination task 134 causes satellite 12" to notify billing center 32 (FIG. 1) via gateway 22 (FIG. 1) and PSTN 30 (FIG. 1) as discussed previously. Thus, billing center 32 will reinstate the conventional airtime rates. Billing center could reinstate the conventional rates for any new call communications originating in coverage zone 16 and/or reinstate the conventional rates for any ongoing calls from the point in time in which the preferred communications period is terminated.

Following task 134, a task 142 is performed. Like task 124 discussed previously, task 142 causes system 10 (FIG. 1) to resume conventional operation. As discussed previously, conventional operation pertains to maintaining and managing call connections and includes the resumption of conventional airtime charges. In connection with task 142, process 46 loops back to task 47 in order to periodically perform resource evaluation subprocess 48 to determine if conditions have become favorable for the initiation of another preferred communications period. Subprocess 48 may be performed each time another one of satellites 12 begins radio communications services in a coverage zone 16. Alternatively, resource evaluation subprocess 48 may be performed after a predetermined elapsed duration.

Accordingly, process 46 continually monitors for periods of low activity on communications channels 40 allocated to satellites 12 of satellite-based communication system 10 and initiates a preferred communications period when conditions are favorable for accommodating additional call communications.

In summary, the present invention teaches a system and method for controlling preferred communications periods in a satellite-based communication system. The system and method provide a mechanism for potentially increasing call activity and therefore revenue by detecting low call activity periods, informing subscriber units, and offering incentives, in the form of discounted airtime rates, during these low activity periods. No predictions of call activity, which may be of poor accuracy, are required, and no predicted complex rate schedules caused in part by orbital geometries need be understood by subscribers. The system and method are executed by the satellites initiating a near real time onset of the preferred communications periods. The satellites control the preferred communications period by adapting to variations in actual communication channel usage, variations in available power level, and variations in satellite health. Thus, a preferred communications period need not follow time of day, day of week, or other constraints composed by complex orbital geometries, but can be initiated as low subscriber activity is detected and appropriate functional status conditions are found aboard satellites.

Although the preferred embodiments of the invention have been illustrated and described in detail, it will be readily apparent to those skilled in the art that various modifications may be made therein without departing from the spirit of the invention or from the scope of the appended claims. For example, the system and methodology described herein may be performed in a different sequence of tasks, the initiation of the preferred communication period may be determined from the interrogation of more than two satellites, the processes disclosed herein may be performed at the system control segment, and/or performed in conjunction with conventional on-peak/off-peak airtime billing strategies previously adopted by the satellite-based communication system.

What is claimed is:

1. In a satellite-based communication system that provides service to a plurality of subscriber units, a method of controlling a preferred communications period comprising the steps of:

determining an unused channels level for a first satellite in said satellite based communication system, said unused channels level corresponding to a quantity of idle communication channels out of a total quantity of communication channels allocated for radio communication with said satellite;

initiating said preferred communications period when said unused channels level is greater than a predetermined unused channels threshold;

informing said plurality of subscriber units of said preferred communications period in response to said initiating step;

ascertaining a potential resource level for a second satellite in said satellite-based communications system, said potential resource level being a quantity of potentially idle communication channels out of a second total quantity of communication channels assigned for radio communication with said second satellite; and performing said initiating step when each of said potential resource level for said first satellite and said potential resource level for said second satellite is above said predetermined unused channels threshold.

2. A method as claimed in claim 1 wherein said satellite provides radio communication services in a coverage zone, said plurality of subscriber units are located in said coverage zone, and said method is executed by said satellite to control said preferred communications period for said coverage zone.

3. A method as claimed in claim 1 wherein said satellite provides radio communication services in a coverage zone throughout a communications duration, said plurality of subscriber units are located in said coverage zone, and said method further comprises the step of continuing said preferred communications period substantially throughout said communications duration.

4. A method as claimed in claim 1 wherein:
said initiating and informing steps are executed by said first satellite;
said ascertaining step is executed by said second satellite; and
said method further comprises the step of communicating said potential resource level from said second satellite to said first satellite.

5. A method as claimed in claim 1 wherein:
said first and second satellites orbit the earth on a substantially common orbital path;
said first satellite provides radio communication services to said plurality of subscriber units located in a coverage zone during a first time period;
said second satellite provides said radio communication services in said coverage zone during a second time period, said second time period occurring after said first time period; and
said initiating step comprises the step of communicating the initiation of said preferred communications period for said coverage zone to said second satellite.

6. A method as claimed in claim 1 wherein said determining, initiating, and informing steps are performed at a first instant, and said method further comprises the steps of:
repeating said determining step at a second instant, said second instant occurring after said first instant;
continuing said preferred communications period when a subsequent unused channels level determined at said second instant is greater than said predetermined unused channels threshold; and
terminating said preferred communications period when said subsequent unused channels level is less than said predetermined unused channels threshold.

7. A method as claimed in claim 6 wherein said terminating step comprises the step of informing said plurality of subscriber units of a termination of said preferred communications period.

8. A method as claimed in claim 1 further comprising the steps of:
identifying an unused power level for said satellite; and
preventing said initiating step when said unused power level is less than a predetermined unused power level threshold.

9. A method as claimed in claim 8 wherein said satellite is a first satellite, said unused power level is a first unused power level, and said method further comprises the steps of:
identifying a second unused power level for a second satellite in said satellite-based communication system; and
preventing said initiating step when said second unused power level is less than said predetermined unused power level threshold.

10. A method as claimed in claim 1 further comprising the steps of:
evaluating a functional status of said satellite, said functional status corresponding to an ability of said satellite to provide radio communication services; and
preventing said initiating and said informing steps when said functional status is less than a predetermined functional status threshold for said satellite.

11. A method as claimed in claim 1 wherein said informing step comprises the step of transmitting, from said satellite, an alert message to said plurality of subscriber units over a broadcast channel allocated to said satellite to inform said plurality of subscriber units of said preferred communications period.

12. A method as claimed in claim 1 further comprising the step of annunciating, in response to said transmitting step, said alert message at said plurality of subscriber units.

13. A method as claimed in claim 1 further comprising the step of notifying a billing center of the initiation of said preferred communications period.

14. In a satellite-based communication system that provides service to a plurality of subscriber units, said satellite-based communication system having first and second satellites that orbit the earth on a common orbital path, a method of controlling a preferred communications period comprising:
determining, at said first satellite, an unused channels level for said first satellite, said unused channels level corresponding to a quantity of idle communication channels out of a first total quantity of communication channels allocated for radio communication with said first satellite;
identifying, at a second satellite, an unused power level for said second satellite, said unused power level corresponding to a remaining battery capacity for supporting radio communications with said second satellite;
communicating said unused power level from said second satellite to said first satellite;
initiating, at said first satellite, said preferred communications period when said unused channels level is greater than a predetermined unused channels threshold and said unused power level is greater than an unused power level threshold; and
informing, from said first satellite, said plurality of subscriber units of said preferred communications period in response to said initiating step.

15. A method as claimed in claim 14 wherein:
said first satellite provides radio communication services to said plurality of subscriber units located in a coverage zone during a first time period;
said second satellite provides said radio communication services in said coverage zone during a second time period, said second time period occurring after said first time period; and
said method further comprises communicating, from said first satellite, the initiation of said preferred communications period for said coverage zone to said second satellite.

16. A method as claimed in claim 15 further comprising:

determining, at said second satellite during said second time period, a subsequent unused channels level for said second satellite, said subsequent unused channels level being a subsequent quantity of idle communication channels out of a second total quantity of communication channels allocated for radio communications with said second satellite;

continuing said preferred communications period when said subsequent unused channels level is greater than a second predetermined unused channels threshold; and terminating said preferred communications period when said subsequent unused channels level is less than said predetermined unused channels threshold.

17. A method as claimed in claim 14 further comprising:

ascertaining at said second satellite, a potential unused channels level for said second satellite, said potential unused channels level corresponding to a quantity of potentially idle communications channels out of a second total quantity of communication channels allocated for radio communications with said second satellite;

preventing said initiating step when said unused channels level is less than said predetermined unused channels threshold; and preventing said initiation step when said potential unused channels level is less than a second predetermined unused channels threshold.

18. A method as claimed in claim 14 further comprising:

identifying a current unused power level for said first satellite; and preventing said initiating step when said current unused power level is less than a current predetermined power level threshold.

19. A method as claimed in claim 14 further comprising:

evaluating a first functional status of said first satellite, said first functional status corresponding to an ability of said first satellite to provide radio communication services;

evaluating a second functional status of said second satellite, said second functional status corresponding to an ability of said second satellite to provide radio communication service; and preventing said initiating and said informing steps when one of said first functional status and said second functional status is less than predetermined functional status thresholds.

20. A radio communication system that provides service to a plurality of subscriber units, comprising:

a plurality of satellites;

a billing center in communication with said plurality of satellites; wherein each of said plurality of satellites has means for controlling a preferred communications period, said has means for controlling including:

means for determining an unused channels level for each of said plurality of satellites, said unused channels level being a quantity of idle communication channels out of a total quantity of communication channels allocated to said each of said plurality of satellites for radio communication;

means for identifying an unused power level for each of said plurality of satellites;

means for initiating said preferred communications period when said unused channels level is greater than a predetermined unused channels threshold and when said unused power level is greater than a predetermined unused power level threshold;

means for informing said plurality of subscriber units of the initiation of said preferred communications period; and means for notifying said billing center of the initiation of said preferred communications period.

21. A radio communication system as claimed in claim 20 wherein said means for controlling determines said unused channels level for each of said plurality of satellites at a first instant, and said means for controlling further comprises:

means for determining a second unused channels level for each of said plurality of satellites at a second instant, said second instant occurring after said first instant;

means for terminating said preferred communications period when a subsequent unused channels level determined at said second instant is below said predetermined unused channels threshold; and means for notifying said billing center of the termination of said preferred communications period.

* * * * *